United States Patent [19]

Gardner et al.

[11] Patent Number: 4,824,245
[45] Date of Patent: Apr. 25, 1989

[54] RESPONSE RATIOING ANGLE OF ARRIVAL SENSOR THAT IS RESPONSIVE TO SCINTILLATION

[75] Inventors: Leland V. Gardner, Buellton; Arthur H. Hardy, Santa Barbara, both of Calif.

[73] Assignee: Santa Barbara Research Center, Goleta, Calif.

[21] Appl. No.: 235,743

[22] Filed: Aug. 19, 1988

Related U.S. Application Data

[63] Continuation of Ser. No. 33,422, Apr. 2, 1987.

[51] Int. Cl.⁴ .................. G01B 11/26; G01C 1/00
[52] U.S. Cl. ............................. 356/141; 356/152
[58] Field of Search ............... 356/141, 152; 350/172, 350/314

[56] References Cited

U.S. PATENT DOCUMENTS

| | | | |
|---|---|---|---|
| 2,700,318 | 1/1955 | Snyder | 356/141 |
| 3,137,794 | 6/1964 | Seward | 356/152 |
| 3,320,424 | 5/1967 | Olson et al. | 356/141 |
| 3,627,428 | 12/1971 | Bergman | 356/141 |
| 3,668,406 | 6/1972 | Reid et al. | 350/172 |
| 3,858,201 | 12/1974 | Foster | 356/152 |
| 3,951,550 | 4/1976 | Slick | 356/141 |
| 4,185,919 | 1/1980 | Williamson | 356/141 |
| 4,325,633 | 4/1982 | Gardner | 356/141 |
| 4,392,729 | 7/1983 | Tsunefuji | 350/172 |
| 4,410,270 | 10/1983 | Zuckerman | 356/152 |
| 4,514,083 | 4/1985 | Fukuoka | 356/152 |
| 4,624,564 | 11/1986 | Johnson | 356/152 |

Primary Examiner—Stephen C. Buczinski
Attorney, Agent, or Firm—W. C. Schubert; V. G. Laslo; A. W. Karambelas

[57] ABSTRACT

An improved apparatus is disclosed for reliably and unambiguously sensing the angle of arrival of an electromagnetic radiation beam by a remote source. A sensor assembly 2 receives, through an optical window 22, the incident beam which is directed toward first and second detectors 10, 12 by a gradient beam splitter 24. The beam splitter 24 has a gradient of reference and transmittance deposited along one surface which is correlated to the angle of arrival of the radiation. The first detector 10 and second detector 12 receive a portion of the incident beam energy by reflection and transmission respectively from the beamsplitter 24. The ratio of a difference to a sum of the detector responses to the received energy is thereby also correlated with the angle of arrival. Atmospheric scintillation, which causes shifting concentrations of energy in clusters or "scintels" within the beam, is compensated by the action of gradient opaque stripes of the beam splitter 24 which divide the beam by a constant factor irrespective of the energy distribution. Thus when the ratio of difference to sum of the responsee to the divided beam by the first and second detector 10, 12 is taken, the correlation with angle of arrival is not affected by the shifting energy.

20 Claims, 6 Drawing Sheets

RESPONSE RATIOING ANGLE OF ARRIVAL SENSOR THAT IS RESPONSIVE TO SCINTILLATION

This application continuation of application Ser. No. 033,422, filed Apr. 2, 1988.

BACKGROUND OF THE INVENTION

The disclosed invention generally relates to angle of arrival determining systems which sense irradiation by a remote source of electromagnetic energy where the radiated energy beam is substantially coherent and or parallel, and more particularly is directed to an angle of arrival determining system which provides reliable angle of arrival determination in the presence of atmospheric scintillation.

Angle of arrival determining systems are used, for example, in military vehicles such as aircraft or tanks to detect incident radiation beams emanating from a remote source which may be a threat to the vehicle. In such cases, the purpose of the system is to determine the direction from the vehicle to the threat and so warn the vehicle operators. Such systems may be used in conjunction with other electromagnetic sensor systems which are designed to determine the type of electromagnetic source from which the incident radiation emanates. Sensors for laser target designators used in vehicles or from fixed locations also may benefit from such systems.

One general type of angle of arrival determining system includes a sensor assembly having an array of many detectors arranged in a semicircle behind an aperture in such a way that, depending on the angle of arrival of the incident energy beam, different detectors in the array are illuminated. Detector outputs are evaluated and the angle of arrival is determined by association with the position of the detector having the greatest output.

This system is very complex electronically and expensive as a result.

Another known system includes a sensor having two detectors separated by two reflecting surfaces and positioned in such a way that the relative amount of energy falling on each detector varies with the angle of arrival of the energy beam. In such a device, the ratio of output of one detector to the other is theoretically proportional to the angle of arrival. Generally, two sensor assemblies or two sets of detector arrays are required for determination of the compound angle of arrival. They may be arranged in orthogonal planes, each measuring one component of the total angle.

Such a system is generally less expensive to manufacture than the multiple-detector system described above. However, presence of atmospheric scintillation due to changing refraction of the atmosphere (the mechanism which, for example, makes stars twinkle, or creates mirages) adversely affects the reliable determination of the angle of arrival. When the energy beam passes through an atmospheric path typical in many practical applications of such systems, scintillation creates rapidly varying, non-uniform, concentrated energy peaks and valleys in segments of the beam. This condition occurs frequently. In such systems atmospheric scintillation is known to make the beam erroneously appear to come from another direction. This occurs because the beam energy in such systems is spread over two or more detectors and scintillation causes non-uniformity of the energy distribution within the beam pattern. As a result, detector outputs are not associated with or indicative of the angle of arrival.

The ratioing system described above does not solve the problem of providing reliable and presence of atmospheric scintillation. Such a solution would satisfy a long felt need for aircraft, military and other vehicle applications of laser detection systems. The disclosed ratioing system does provide such a solution.

SUMMARY OF THE INVENTION

It would, therefore, be an advantage to provide an improved angle of arrival determining system which provides for reliable angle of arrival determination in the presence of atmospheric scintillation.

It would also be an advantage to provide a reliable angle of arrival determining system which is not complex and which is not affected by atmospheric scintillation.

Another advantage would be to provide a reliable angle of arrival determining system which compensates the effects of atmospheric scintillation.

The foregoing advantages and other advantages and features are provided in a response-ratioing angle of arrival sensor. The invention includes a sensor assembly having two detectors per plane of measurement and means for dividing the incident electromagnetic radiation into first and second radiation components having respective intensities determined by the angle of arrival of said incident radiation. The first and second detectors are respectively responsive to the first and second radiation components and provide outputs which are indicative of the angle of arrival of the incident electromagnetic radiation.

More particularly, the disclosed angle of arrival determining system substantially cancels the effects of scintillation by taking the ratio of the sum and difference of outputs of the first detector and the second detector. In this invention, the said outputs are responsive to the same radiation energy profiles, thereby permitting reliable determination of the angle of arrival in the presence of shifting profiles caused by atmospheric scintillation. The invention has an advantage of providing an angle of arrival determining system wherein the angle of arrival determination is substantially unaffected by angle, within the field of view, at which the electromagnetic energy rays are incident upon the system's sensors. Such is the case both in the plane of determination or any other plane, particularly when the rays are not uniformly distributed as a result of atmospheric scintillation.

BRIEF DESCRIPTION OF THE DRAWINGS

The advantages and features of the disclosed invention will be appreciated readily by persons skilled in the art from the following description when read in conjunction with the drawing wherein:

FIG. 3B further illustrates the effects of blocking of rays arriving parallel to or near the optical axis by the first detector and the compensation for this effect with an auxiliary mirror system.

DETAILED DESCRIPTION OF THE DISCLOSURE

Figure 1:
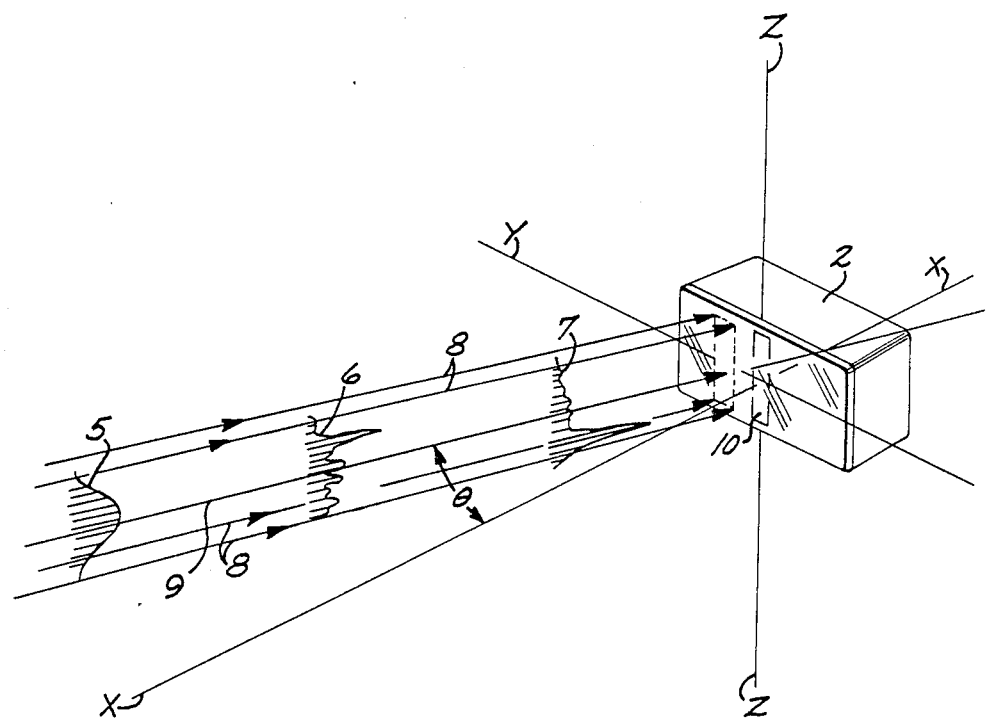
FIG. 1 is a schematic representation of a sensor assembly of the disclosed response-ratioing angle of arrival determining system, showing its use.

Referring to FIG. 1, schematically illustrated therein is the general arrangement of a response-ratioing angle of arrival determining system. The system includes a sensor assembly 2 having an optical axis X-X and disposed so it will determine the angle of arrival $\theta$ of a beam emanating from a remote source of electromagnetic energy along an axis 9. In FIG. 1, the angle of arrival $\theta$ is determined in the plane formed by the optical axis X-X and axis Y-Y, by the sensor assembly 2 having its first detector 10 and second detector (not shown) disposed in the Y-Z plane.

Reference in this disclosure to "beam" means any beam of electromagnetic radiation energy having rays which are substantially coherent or parallel one to the other when they reach the angle of arrival determining system.

The sensor assembly will be completely immersed in the bundle of energy rays emanating from a source remotely located at distances typical of the applications of such systems. The rays will be substantially parallel, emanating from, for example, a laser or a visible light source having a cross-section which is very small in comparison to the distance from the source to the sensor assembly 2. However, since these rays are substantially parallel, only certain ones of them will strike the detectors. The rays 8 outline the bundle of energy rays, approximately the size and shape of a detector, emanating from the remote source, which will ultimately strike the detectors in the sensor assembly 2.

Continuing to refer to FIG. 1, this invention is particularly concerned with overcoming the effects of changing refraction in the atmospheric path between the remote source and the sensor assembly 2 which changes the distribution of intensity of a beam emanating from the remote source. Consider a beam emanating from such a remote source which may, at the source, have a steady, guassian distribution of electromagnetic energy, as schematically illustrated by an energy profile curve 5. As the beam passes through the atmosphere, it may be changed by atmospheric refraction to a sharply non-uniform distribution of energy such as schematically illustrated in energy profile 6. As the beam proceeds towards the sensor assembly 2, it may be again modified to a different distribution as schematically illustrated by energy profile 7. This process may continue until the beam arrives at the sensor assembly 2.

Examination of the energy profiles 6, 7 will show that different segments of the beam, commonly referred to as "scintels", may have continually varying, dramatically sharp, concentrated energy peaks and valleys that shift rapidly across the beam with time. It will be appreciated that it is the rapid shifting of these scintels across the detector arrays which, in prior ratioing systems, causes the ambiguity and unreliability in determining the angle of arrival.

From the following description of the disclosed response-ratioing angle of arrival system and the figures referenced, it will be come apparent how the present invention permits a direct determination of said angle from the detector outputs and overcomes the ambiguity and unreliability of angle of arrival determination.

Figure 2A:
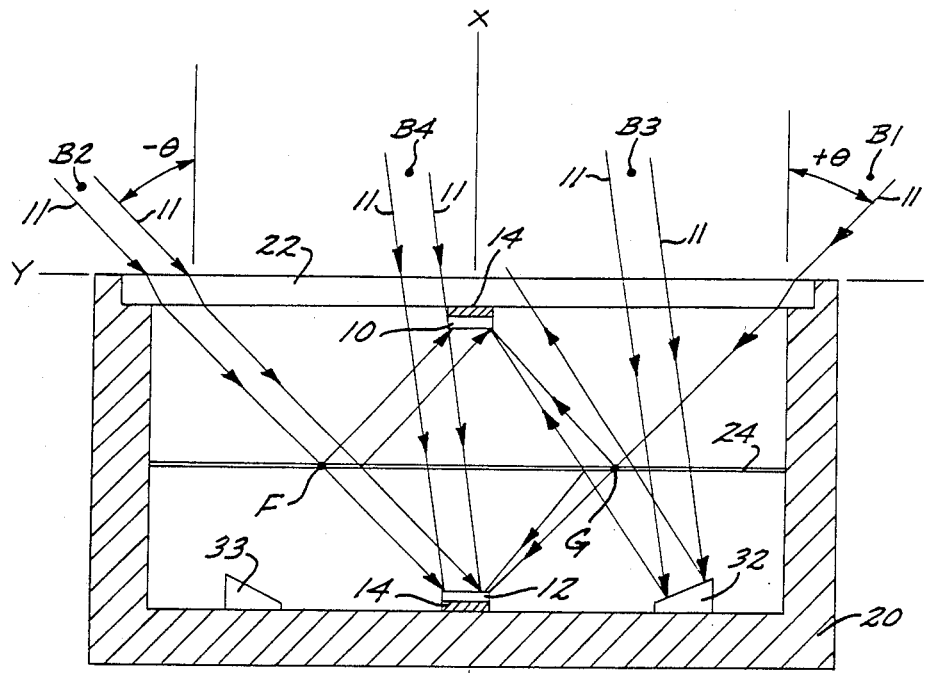
FIGS. 2A–2B are a side view cross-section and end view cross-section of a preferred embodiment of a sensor assembly of FIG. 1.
Figure 2B:
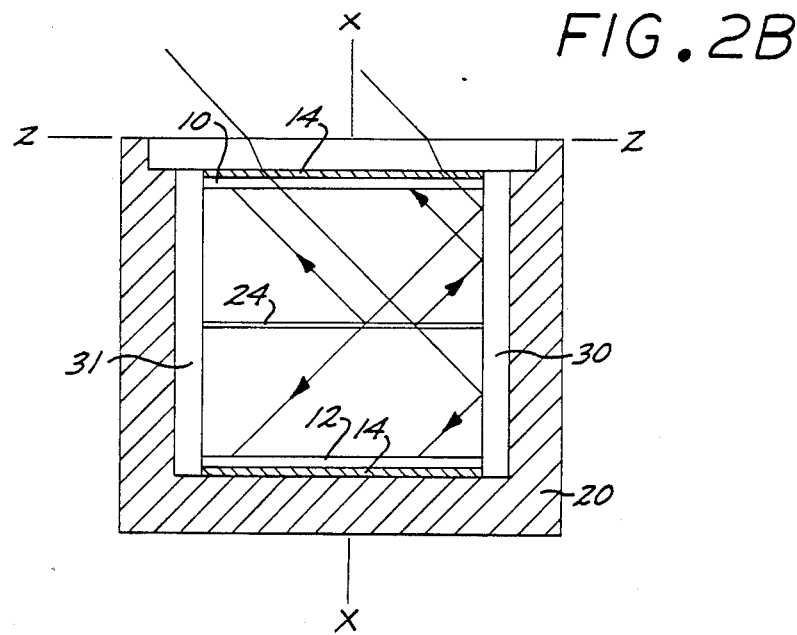

The sensor assembly 2 is shown schematically in more detail in FIGS. 2A and 2B. The sensor 2 includes a housing 20 which is essentially an open, rectangular box with parallel sides, parallel ends and a bottom. A transparent optical window 22 is mounted at the top of the housing 20, parallel to the bottom. A first detector 10 and its substrate 14 are mounted on the inside surface of the transparent optical window 22. A second detector 12, of equal size and responsiveness to the incident energy as the first detector 10 and its substrate 16, are mounted on the bottom of the housing 20 and are aligned parallel to the first detector 10. Side mirrors 30, 31 are mounted against the inner sides of the housing 20 parallel to each other. Auxiliary mirrors 32, 33 are mounted on the bottom of the housing 20 at equal distances from the second detector 12. The auxiliary mirrors 32, 33 face toward the first detector 10 at equal and opposite angles.

A beam splitter 24, having a gradient of reflectance and corresponding transmittance, is mounted within the housing 20 equidistant from the detectors 10, 12 and parallel to them. All inside surfaces of the housing 20 except the side mirrors 30, 31 and auxiliary mirrors 32, 33 are made non-reflecting and to absorb stray energy.

The dimensions of the housing 20 are determined by the type and size of the detectors 10, 12, which in turn depend on the amount of energy the system is required to collect. A sensor designed for determining the angle of arrival of, for example a laser beam of near-infrared radiation, might have approximate dimensions, height, width and length, of 1 inch, 1 inch and 1.5 inches respectively. Such a sensor could include silicon first and second detectors 10, 12 each approximately one-inch long and one-tenth inch wide.

In FIG. 2A, beams B1, B3 and B2, represent examples of ray bundles arriving from different directions at the sensor assembly 2. B1 represents a beam which might arrive at an angle $+\theta$ at the extreme right edge of the field of view of sensor assembly 2. B2 represents a beam which might arrive at an angle $-\theta$ at the opposite edge of the field fo view of the sensor assembly 2. B3 and B4 represent beams which might arrive nearly parallel to the optical axis X-X of the sensor assembly 2. A convention has been established for this description wherein angles measured clockwise from the optical axis are considered plus and those measured counterclockwise from the optical axis are considered minus.

The rays 11 outline the edges of the bundle of energy rays which, in each example of an incident beam, will strike the first detector 10 and the second detector 12. Rays outside of these will not strike a detector at all and will be absorbed by the absorbent coating on the walls of the housing 20. The rays 11 can be used to trace the path of the incident radiation to the detectors.

Consider in FIG. 2A that the incident beam, or more descriptively called "ray bundle", is B2 which arrives at the edge of the field of view of sensor assembly 2. It passes through the window 22 and falls upon the gradient beam splitter 24. The beamsplitter 24 is coated with a partially reflecting material in such a way that some of the incident ray bundle B2 will be reflected from the coating and some of the incident ray bundle B2 will pass through the coating. Ray bundle B2 will be divided into a first component which is reflected from the surface of the gradient beam splitter 24 towards the first detector 10, and a second component which is transmitted by the gradient beam splitter 24 towards the second detector 12.

A ray bundle arriving in the X-Y plane will fall upon the gradient beam splitter 24 at different points along the length of the beam splitter 24 depending on the angle of arrival $\theta$. This can be seen by inspection of ray bundles B1-B4 in FIG. 2A. The beam splitter 24 is coated in such a way that the amount of reflected and transmitted energy rays depends on the place on the beam splitter 24 illuminated by the ray bundle. The gradient beam splitter 24 is provided with a coating having a reflectance and complementary transmittance which varies uniformly from one edge of the field of view to the other, for example, from 80 percent reflectance and 20 percent transmittance at point F to 20% reflectance and 80% transmittance at point G. Points F and G are the points in this cross-sectional view where the rays at the field-of-view edge strike the gradient beam splitter. It is the gradient in reflectance and transmittance of beam splitter 24 which allows for correlating the ratio of first detector 10 response to the second detector 12 response with angle of arrival.

In FIG. 2A, if the rays 11 of a ray bundle arriving at an angle between $+\theta$ and $-\theta$ such as B1, B2 or B4 are followed to the first detector 10 and the second detector 12, it can easily be seen that the first detector 10 will respond to the first component of radiation which is divided from the bundle of rays by reflection from the gradient beam splitter 24. The second detector 12 will respond to the second component of radiation which is divided from the rays 11 by transmission through the gradient beam splitter 24. For certain ray bundles arriving parallel or near-parallel to the optical axis X-X and which, therefore may be blocked or partially blocked by the first detector substrate 14, another path to the detectors 10, 12 is provided which is discussed shortly.

FIG. 2A shows the rays arriving parallel to the X-Y plane, wherein the sensor assembly 2 determines the angle of arrival. Most likely, however, the incident beam will not lie parallel to the X-Y plane. It may have a component which lies in the X-Z plane. FIG. 2B shows how such a component will be reflected from the side mirrors 30, 31.

Typical rays in the X-Z plane of an incident beam are represented in FIG. 2B by the rays E. Rays E are reflected by side mirror 30 to the beam splitter 24 and then proceed to the detectors 10, 12 as described above. The rays E in FIG. 2B are shown arriving from a direction above the sensor assembly 2 and are reflected by side mirror 30. Rays arriving from below the sensor assembly 2 will be reflected from side mirror 31 in a similar manner.

The reflection from the side mirrors 30, 31 does not change the position of the incident beam along the length of the beam splitter 24. Therefore the energy divided by reflection and transmission by the beam splitter is indicative of angle of arrival in the case of an out-of-plane arrival as well as an in-plane arrival.

Currently known designs of gradient beam splitters include a layer of partially reflecting material, usually a thin metallic film, deposited on glass or other transparent optical substrate. The reflecting layer is deposited in tapering thickness along the length of the beam splitter 24. The amount of reflection and complementary transmission of the beam splitter 24 depends on the thickness of the deposited layer. By tapering the thickness of the deposited layer along the length of the beam splitter 24, the ratio of reflectance to transmittance of the beam splitter 24 can be tapered along its length.

Figure 3A:
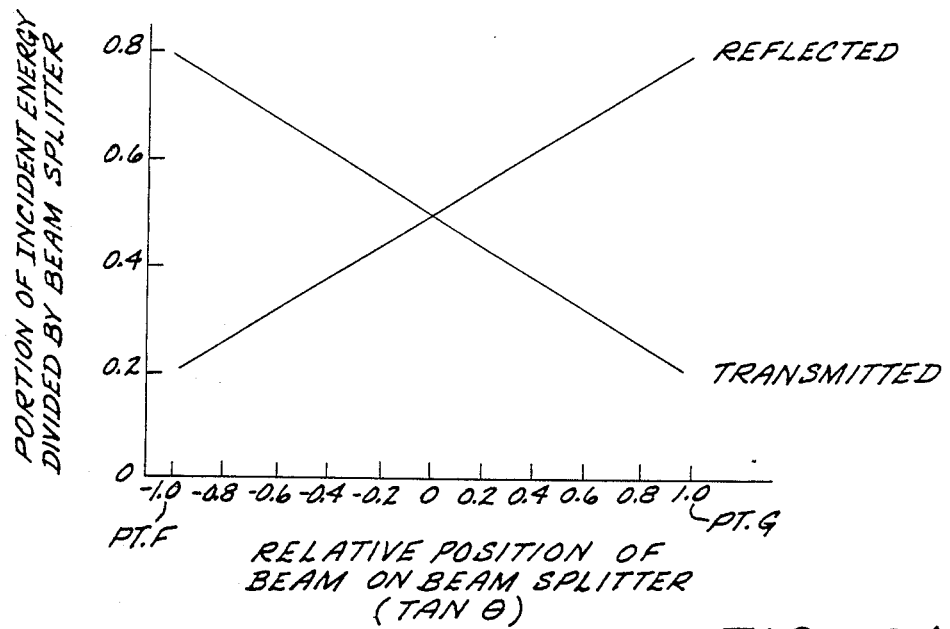
FIG. 3A is a diagram illustrating the portion of the incident electromagnetic radiation energy which is reflected and transmitted by the gradient beam splitter, of the sensor assembly of FIG. 1, as a function of where on the gradient beam splitter the incident bundle of electromagnetic energy rays falls.

FIG. 3A shows how the reflectance and transmittance of the beam splitter 24 varies along its length when a uniformly tapering thickness of the partially-reflecting layer is used.

It should be appreciated from the geometry of the sensor assembly 2, that the relative position of an incident energy ray bundle on the beam splitter 24 may be equated to the tangent of the angle of arrival, Tan $\theta$. The angle $\theta$ illustrated at the point F on the diagram is $+45$ degrees and at the point G is $-45$ degrees. Tan $\theta$ is $+1$ and $-1$ respectively, at these points. The total field of view is represented as 90 degrees.

Outside of the region between the points F and G, the beam splitter 24 is transparent to incident radiation. Except for the radiation for which an alternate path is provided to the detectors 10, 12 by way of the auxiliary mirrors 32, 33 under the circumstances described below, all other radiation will pass through the beam splitter 24 and be absorbed by the absorbent coating on the walls of the sensor assembly 2.

Referring again to FIG. 2A, it can be seen that as the incident beam approaches a position which is nearly parallel to the optical axis X-X, as for example the position represented by beam B4, the active areas of the first detector 10 and second detector 12 will begin to be blocked by the substrate 14 of the first detector 10. The response of the detectors 10, 12 to the incident energy will begin to decrease until, when the beam is directly parallel to the optical axis X-X, the response of the first and second detectors becomes zero. The range of angles at which this blocking occurs depends on the detector width and spacing between detectors. The portion of radiated energy which may fall upon the first detector 10 and second detector 12 as a function of relative position of the ray bundle on the beam splitter 24 is shown in FIG. 3B.

Figure 3B:
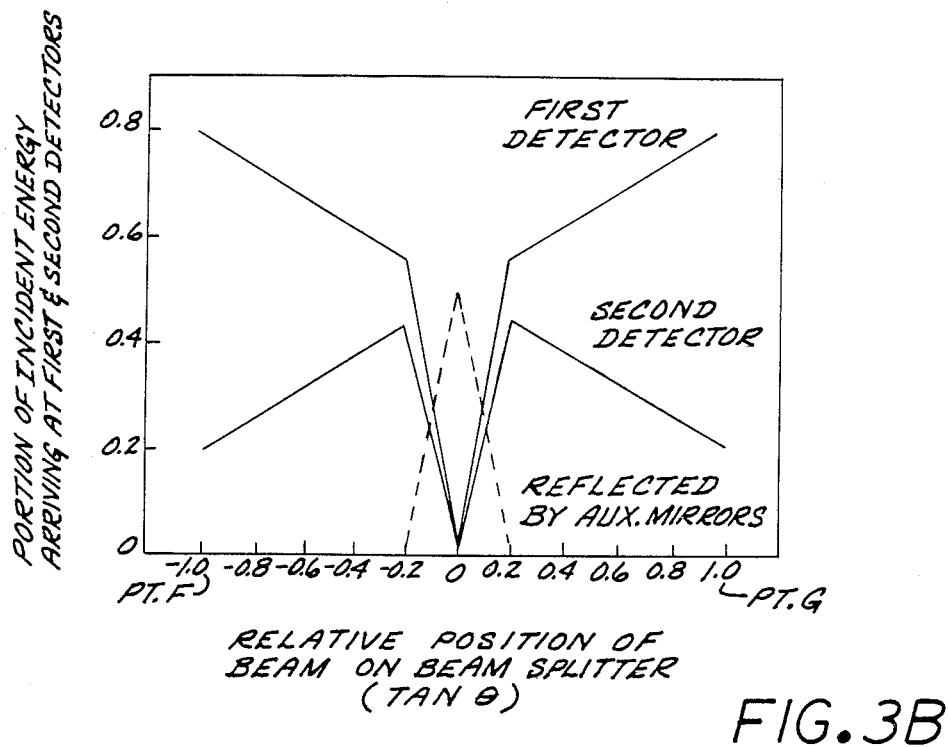
FIG. 3B is a diagram illustrating the portion of incident electromagnetic radiation energy which falls on the first and second detectors of the sensor assembly of FIG. 1, as a function of where the incident bundle of electromagnetic energy rays falls upon the gradient beam splitter.

FIG. 3B shows that in the case of the sensor assembly illustrated, the sampling of incident energy reaching either the first or second detectors 10, 12 rapidly decreases between relative positions on the beam splitter 24 of plus and minus 0.2 (which corresponds to angles of arrival of plus and minus 11.3 degrees). The sharp fall-off of energy in this region is caused by blocking of the incident tray bundle by the first substrate 14. Energy reaching the detectors 10, 12 becomes zero at the relative position of zero which is on the optical axis X-X. To compensate for the blocking of the beam in the range of angles discussed, auxiliary mirrors 32, 33 are placed so that they will take different, and unrestricted samples of the incident energy beam, and reflect them toward the beam splitter. Thus, radiation arriving at angles close to the optical axis X-X proceeds by an alternate path to the first and second detectors 10, 12.

FIGS. 2A and 3B will assist in understanding the following explanation of the auxiliary mirror operation. In FIG. 2A, the right auxiliary mirror 32 and left auxiliary mirror 33 are disposed behind a fully transparent section of the beam splitter 24 substrate. The auxiliary mirrors 32 and 33 are mounted on the bottom of the housing 20 and positioned on either side of and equidistant from the second detector 12, toward the walls of the housing.

Consider the ray bundle B4 which arrives nearly parallel to the optical axis X-X. Just as a ray 11 of ray bundle B4 is beginning to be blocked by the substrate 14, a ray 11 of ray bundle B3, which is parallel to B4, and which strikes the auxiliary mirror 32, begins to be reflected toward the beam splitter 24. As the incident beam moves closer into parallel with the optical axis X-X, more and more rays are reflected from the auxiliary mirror 32 to the beam splitter 24 and then relayed onto the detectors 10, 12 by transmission and reflection from the beam splitter 24. Finally, when the beam is parallel to axis X-X, all of the rays 11 of ray bundle B3 reach the detectors 10, 12 by way of reflection from auxiliary mirror 32. It can be easily seen that reflections from the left auxiliary mirror 33 will behave the same as does mirror 32 but in "mirror image" because mirror 33 is placed equidistant from and on the other side of the second detector 12 from the right auxiliary mirror 32.

Consider the energy reflected by auxiliary mirror 33. It can be seen that radiation is relayed to the first detector 10 by transmission through the beam splitter 24 and to the second detector 12 by reflection from the bottom of the beam splitter 24. The transmission and reflection from the bottom side of the beam splitter 24 is identical to that from the top. The division of the radiation components is achieved, therefore, in the same manner as when the incident rays fall upon the top of the beam splitter. However, the portion of incident energy arriving at the first detector 10 and second detector 12, as reflected from auxiliary mirror 33, is reversed from the case where, except for blockage by substrate 14, an incident beam would fall upon the top of the beam splitter.

The auxiliary mirrors 32, 33 are symmetrically placed about the optical axis X-X. Because the action of auxiliary mirror 33 is the same as for auxiliary mirror 32, but in "mirror image", the incident ray bundle reflected by auxiliary mirror 33 falls upon a portion of the beam splitter 24 having a ratio of reflectance to transmittance exactly complementary to the place on the beam splitter where the ray bundle reflected by auxiliary mirror 32 falls. As a result, the sum of the radiation reaching the first detector 10 and second detector 12 by relay from the auxiliary mirrors 32, 33 is the average of the radiation received by complementary reflectance and transmittance of the beam splitter 24. This average radiation is the same as would be received from rays reflected and transmitted from beam splitter 24, at points near its center, corresponding to the same angle of arrival, except for blockage by substrate 14. Therefore, the radiation reaching the detectors 10, 12 is indicative of the angle of arrival as though the incident rays reached detectors 10, 12 by reflection and transmission from the central portion of the beam splitter 24.

From the foregoing discussion it should be appreciated that sense of the beam splitter 24 coding is preserved during operation of the auxiliary mirrors. This can be seen if the rays 11 of beam B3 are traced to detectors 10, 12. If beam B3 moves in a positive direction (to the right in FIG. 2A) rays 11 move in a negative direction (to the left in FIG. 2A). Reflection from the bottom of beam splitter 24 therefore decreases and transmission through beam splitter 24 increases. As a result, energy falling on second detector 12 decreases and energy falling or first detect or 10 increases. This, of course, in the same sense of coding as if the beam were received from the top of beam splitter 24.

Figure 3C:
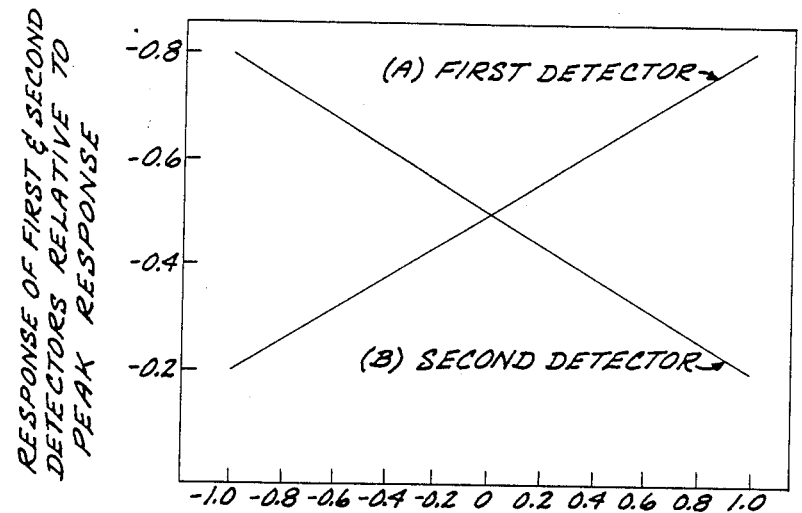
FIG. 3C is a diagram of the response of the first and second detectors of the sensor assembly of FIG. 1.

The operation of the auxiliary mirrors can be further appreciated when viewing FIG. 2A in conjunction with FIGS. 3A-3C. In comparison to FIG. 3A which illustrates the energy which is transmitted and reflected from the beam splitter 24, FIG. 3B shows that an amount of radiation energy is lost at the first detector 10 and second detector 12 when an arriving beam is partially or fully blocked by the first detector substrate 14. Also in FIG. 3B, the dotted line illustrates the portion of incident energy reflected by one auxiliary mirror 32 to the beam splitter 24. When the energy reflected from both auxiliary mirrors 32, 33, which is twice that of the one mirror 32, is summed and then apportioned to the detectors 10, 12 according to the action of the gradient beam splitter 24, the response of the detectors 10, 12 as a function of the angle of arrival of the beam is the same as if there were no blockage by the substrate 14.

FIG. 3C illustrates the response of the detectors 10, 12 to all incident radiation after compensation by the action of the auxiliary mirrors 32, 33 in combination with the beam splitter 24. The response of the first detector 10 is curve A and of the second detector 12 is curve B. The curves are seen to be analagous, respectively, to the variation in reflectance and transmittance of the beam splitter 24 depicted in FIG. 3A, and therefore indicative of the angle of arrival. The curves A, B vary linearly as a function of the tangent of the angle of arrival Tan $\theta$. The ratio of the difference to the sum of the responses of the first detector 10 and the second detector 12 is also linear function with Tan $\theta$.

$$\theta = \text{Tan}^{-1} K (A-B/A+B) \quad \text{(Equation 1.)}$$

The result of taking the said ratio is, therefore, indicative of the angle of arrival $\theta$. The said ratio can be determined electronically by conventional and well known signal processing means.

Referring again to FIG. 2A, the beam splitter 24 may be commercially obtained. The reflecting film on the surface of the beam splitter 24 is deposited in tapering thickness along the dimension which is at right angles to the length of the detectors. In such beam splitters the deposited gradient is sandwiched between two substrates of the same thickness, one for mechanical support and the other to supply necessary optical symmetry. The amount of reflectance and complementary transmittance of a beam splitter depends principally on the thickness of the film. However, in such films, the transmittance is affected by absorption as well as reflectance of the film. The absorption is an efficiency loss which is not desired.

Figure 4A:
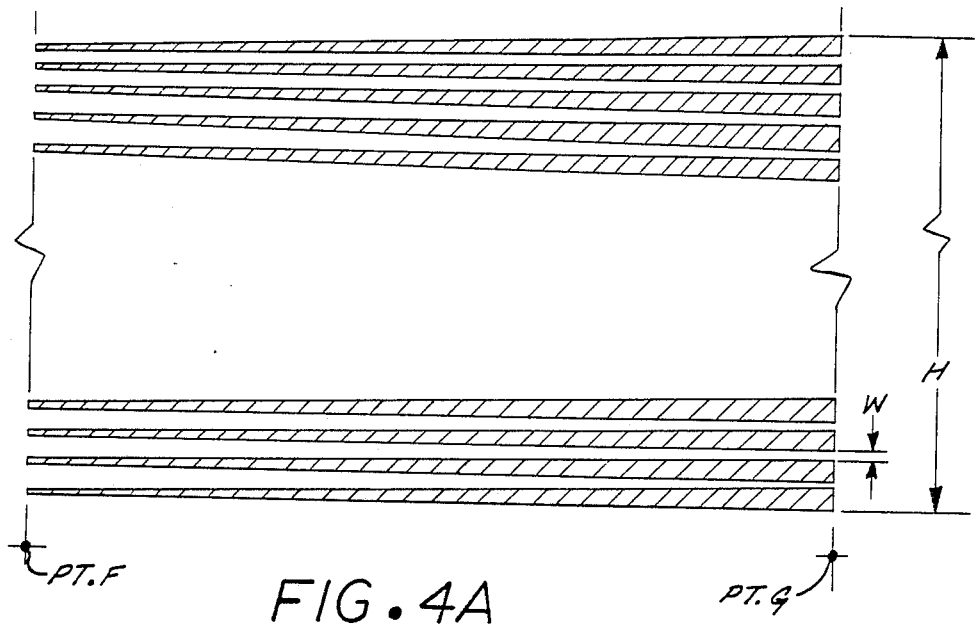
FIGS. 4A-4B are plan views of wedged-area and stepped-area embodiments of the gradient beam splitter of the sensor assembly of FIG. 1.
Figure 4B:
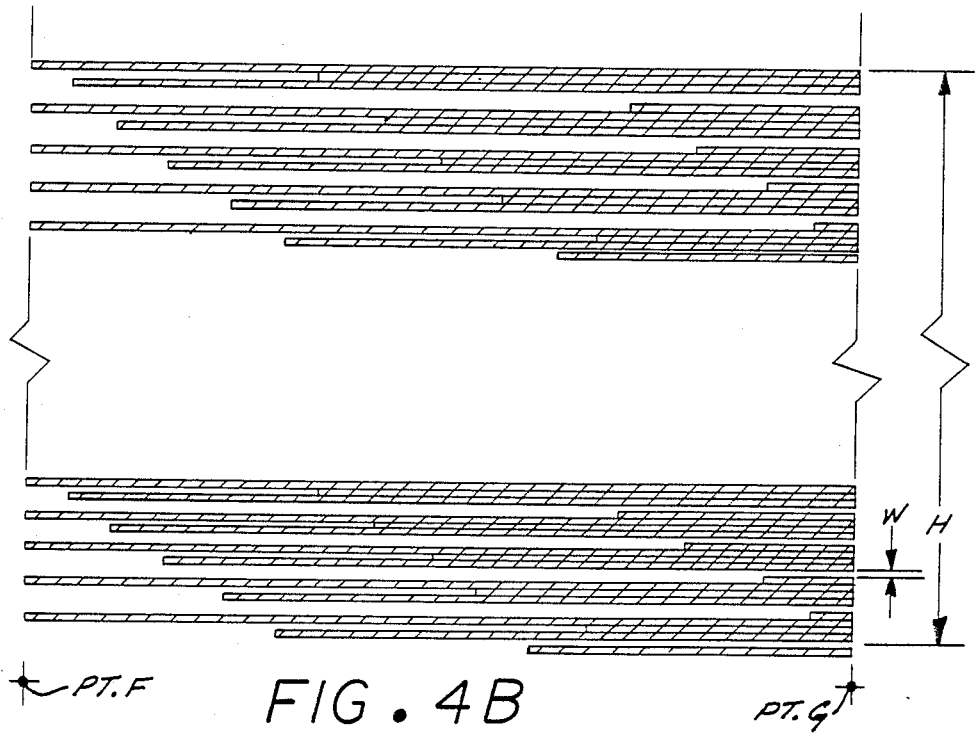

Referring to FIGS. 4A-4B, illustrated therein are plan views of two alternate embodiments of the gradient beam splitter 24. The disclosed embodiments may be referred to as wedged-area and stepped-area film coatings, respectively. The coated, striped areas 40 are fully reflective and the uncoated areas 42 of the substrate are fully transparent. This eliminates absorption of the film as a factor in the transmission of the beam energy. In general, these embodiments are more easily made than the beam splitter having tapered-thickness film.

The coating 40 shown is an example of a repetitive pattern which may be repeated across the width H of the beam splitter 24. Dimension H is parallel to the length of the first detector 10 and second detector 12 and depends on the size of detectors needed to capture the desired amount of energy. Dimension L is perpendicular to the length of the first and second detectors 10, 12 and may be selected depending on the field of view desired for the sensor assembly 2.

In FIG. 4B, the width W of each lineal element of the stepped-area coating may be 0.001 inch. The maximum width of combined elements may be 0.005 inch. This substantially cancels the effects of non-uniform scintels larger than 0.005 inch in a beam disturbed by atmospheric scintillation as explained in subsequent paragraphs. Coating elements of 0.001 inch are consistent with manufacturing techniques for easy repeatability. The dimensions 1 in the step-wise direction of the coating elements are selected to be the same as the width of each detector 10, 12.

In the disclosed invention, the effects of atmospheric scintillation are substantially reduced because both the first detector 10 and the second detector 12 are affected equally by changes in the profile of the incident radiation produced by scintillation. The following paragraphs and FIGS. 4A-B and 5 should lead to an understanding of the means by which this is accomplished.

Along dimension H of the gradient beam splitter 24 the incident ray bundle is divided by a constant factor of both reflection and transmission. In the case of the stepped-area or wedged-area beam splitter, all clusters of rays in the ray bundle larger than the widest area of the opaque stripes 40 (or transparent stripes 42) will be divided by the said constant. In the event that atmospheric scintillation causes the energy rays to be "bunched up" into such small clusters, the constant factor of energy division is substantially maintained. The rays striking the detectors 10, 12 are still in the ratio determined by the average reflection and complementary transmission of the area on the beam splitter 24 where the ray bundle falls.

The first and second detectors 10, 12 are responsive to the average of the energy rays striking each over its length. Therefore, for practical beam sizes, when the responses of the first and second detectors 10, 12 are summed and the ratio taken as described in Equation 1, Tan $\theta$ is not affected by the shifting energy distributions across the width of the beam splitter 24. The angle of arrival may therefore, be unambiguously determined.

Recall from earlier discussion that the variation in energy distribution may be in the plane of measurement or any other plane. Still referring to FIGS. 4A-B, if variations occur in energy distribution in the plane of measurement, this variation will occur along dimension L of the beam splitter 24. There will be a small effect on angle of arrival determination resulting from the finite size of the ray bundle in this dimension. While, as has already been said, the optical properties of the beam splitter 24 are uniform across dimension H, there is, of course, a variation of these properties along dimension L of beam splitter 24. This variation, coupled with the fact the ray bundle of interest has a width equal to that of the detectors 10, 12, can produce slight variations in the determined angle if, in this direction, the energy rays are concentrated toward one edge or the other of the ray bundle. The variations in the determined angle are dependent on the detector width and spacing.

Figure 5:
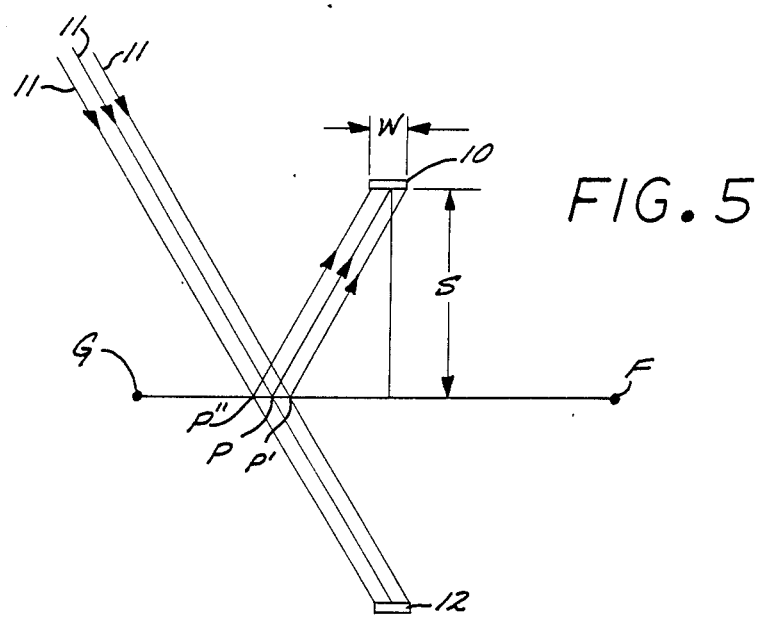
FIG. 5 is a schematic diagram of the geometry of detector width and spacing of the first and second detectors of the sensor assembly of FIG. 1, and for a practical application, the relationship of that geometry to the small variations in the angle of arrival which may be sensed in the plane of determination.

FIG. 5, schematically illustrates the detector width W and spacing S between the first detector 10, the second detector 12 and the beam splitter 24. Incident energy rays 11 are shown falling upon the beam splitter 24 at points P, P' and P" within the field of view. The reflectance and transmittance of the beam splitter along dimension L vary equally but are complementary in value. In this direction the bundle of energy rays 11 incident on each detector 10, 12 is integrated over the detector's width W. If the segments of the beam represented by rays 11 are uniform, the detector response will be an average value indicative of the angle of arrival associated with point P on the beam splitter. If the rays 11 of the beam are concentrated at one edge, then in the extreme cases, the detector response will be indicative of the angle of arrival associated with points P' or P" on the beam splitter.

From the geometry of FIG. 5, the maximum angular error can occur when the incident beam is parallel to the optical axis. Such angular error, call it $d\theta$, can be determined by the following equation:

$$d\theta = \text{Tan}^{-1}(W/2S) \qquad \text{(Equation 2)}$$

The spacing of the detectors may be determined to minimize angular error. If a permissible error is chosen, as for example, an error $d\theta$ is to be 5 degrees for a beam incident at zero degrees (parallel to the optical axis) the spacing S will be 5.71 times the detector width W.

Figures 6A, 6B:
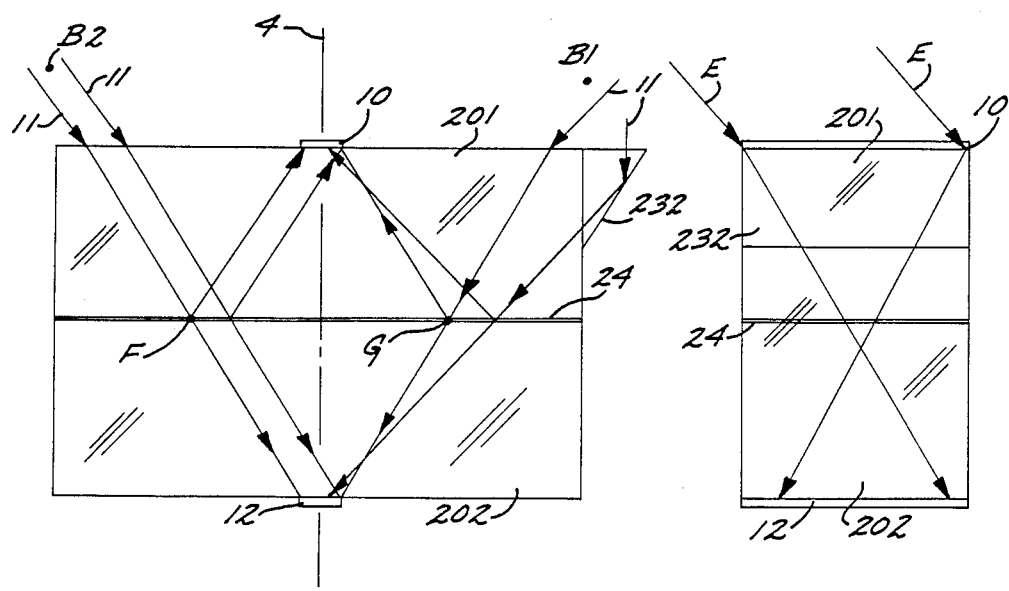
FIGS. 6A-6B are side and end views, respectively, of a further embodiment of the sensor assembly of the disclosed system which utilizes refracting elements.

FIGS. 6A-6B schematically illustrate the alternate embodiment of the invention. This embodiment includes a first transparent optical substrate 201, a second transparent optical substrate 202, a first detector 10, a second detector 12, and an auxiliary prism 232. The first substrate 201 is cemented to the second substrate 202. The gradient beam splitter 24 is deposited on one of the first and second substrates 201, 202. The auxiliary prism 232 is laterally displaced from detector 10 and serves the same function as the two auxiliary mirrors 32, 33 shown in FIGS. 2A-B. In the embodiment of FIGS. 6A-B, the auxiliary prism 232 relays energy rays 11 to the detectors 10, 12 when the incident ray bundle is near-parallel or parallel with the optical axis X-X and therefore blocked by the detector substrate 14.

In the alternate embodiment, the prism 232 relays energy by way of an auxiliary portion of the beam splitter 24 laterally displaced outside of the normal field of view rather than a portion within the field of view as do the auxiliary mirrors 32, 33 in the preferred embodiment. In order to compensate for the energy blocked by substrate 14, the portion of the beam splitter 24 illuminated by the prism 232 is coated with the same pattern as the part of the beam splitter 24 which is blocked from rays parallel or near-parallel to the axis X-X. The total energy which reaches the first detector 10 and the second detector 12 from the auxiliary prism 232 in combination with the reflection from and complementary transmission through the auxiliary portion of the beam splitter 24, is the same as though there were no blockage by substrate 14.

The optical substrates 201, 202 introduce an ambiguity in the angle of arrival determination. A beam arriving in a plane which is not the plane of determination of angle of arrival will be bent onto the gradient beam splitter 24 at an angle nearer to the normal to the beam splitter surface than a beam which has the same angle of arrival but is in the plane of determination. Such a beam will appear to be at a lesser angle of arrival than its true angle.

A correction factor may be determined by well-known methods of ray traceing for the selected dimensions and materials from which the optical substrates 201, 202 are made. A correction factor was derived for substrates 201, 202 and made of glass and having overall dimensions of approximately 1×1×1.5 inches. The correction factor is given as:

$$\theta_{corr} = \theta_{read} \times (1 + (\psi_{read}/88.2)^{2.})$$ (Equation 3)

In Equation 3, $\theta_{corr}$ is the corrected angle of arrival, $\theta_{read}$ is the read or indicated angle of arrival in the plane of determination and $\psi_{read}$ is the read or indicated angle of arrival in the plane orthogonal to the plane of determination. For the substrates 201, 202 described above, the system will read 36 degrees for a beam having a component of 45 degrees in the X-Y plane and a component of 45 degrees in the X-Z plane.

While the air-coupled sensor assembly 2 of FIGS. 2A-B is preferred because it does not require any correction for beams arriving in a plane other than the plane of angle of arrival determination, the alternate embodiment can be smaller and more durable than the preferred design. It presents structural advantages in severe environments. It also has smaller polarization effects.

The alternate embodiment of FIGS. 6A-B requires careful selection of substrate and cement materials to match the indexes of refraction and to substantially eliminate air bubbles.

Figure 7:
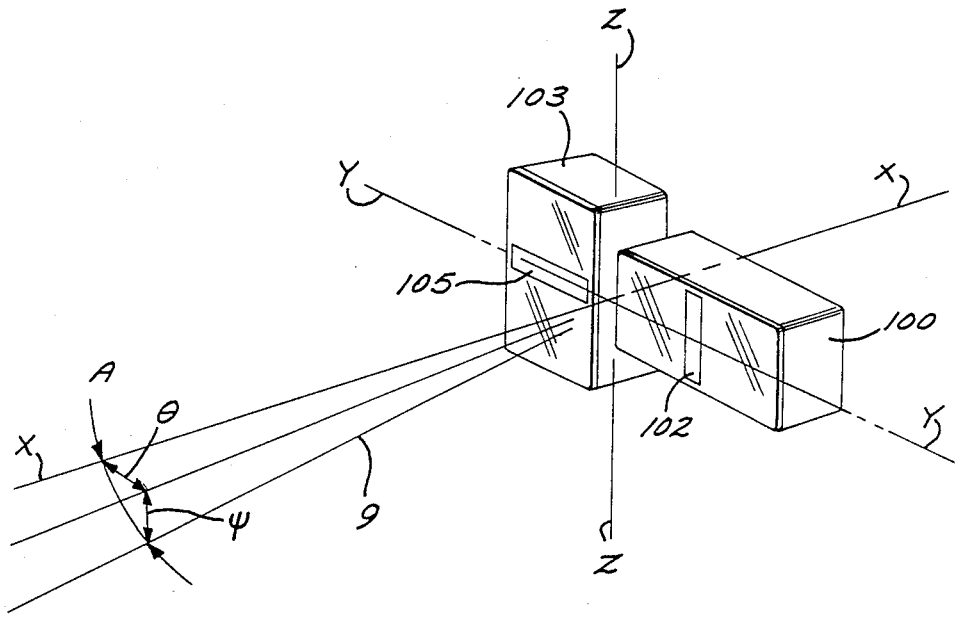
FIG. 7 is a schematic representation of the use of two sensor assemblies to measure the angle of arrival in orthogonal planes and thereby determine the total angle.

Sensor assemblies in accordance with this invention, may be paired and oriented as schematically illustrated in FIG. 7 to determine the angle of arrival in two orthogonal planes. Referring to FIG. 7, the axis of the electromagnetic energy emanating from a remote source 9 forms a compound angle A with respect to the optical axis X-X of the two sensor assemblies 100, 103. A general arrangement is shown wherein the right-hand sensor assembly 100 determines the angle of arrival $\theta$ in the X-Y plane and the left-hand sensor assembly 103 determines the angle of arrival $\theta$ in the X Z plane. In the right-hand sensor assembly 100, the first detector 102 and the second detector (not shown) are disposed lengthwise and parallel along the Z-Z axis. In the left-hand sensor assembly 103 the first detector 105 and the second detector (not shown) are disposed lengthwise and parallel along the Y-Y axis.

The detector responses which are indicative of the angle $\theta$ and the angle $\psi$ may be combined by well-known signal processing means to determine the total angle of arrival A.

The general arrangement of the sensor assemblies 100, 103 shown in FIG. 7 may cover a field of view of up to 90 degrees by 90 degrees. A multiplicity of pairs of sensor assemblies may be disposed to cover a larger desired field of view.

Although the present invention has been described in detail with reference to a particular preferred embodiment and alternate embodiment, persons possessing ordinary skill in the art to include this invention pertains will appreciate that various modifications and enhancements may be made without departing from the spirit and scope of the invention.

What is claimed is:

1. A sensor for determining one angular component of incident electromagnetic radiation comprising:
    a housing having first and second parallel sides that are parallel to the plane containing the angular component of incident electromagnetic radiation to be determined, said parallel sides having facing surfaces reflective of said radiation and defining therebetween two sides of a planar entrance aperture normal to said sides for said radiation;
    a planar gradient beamsplitter located between said first and second parallel sides and oriented parallel to said entrance aperture, said beamsplitter having a portion varying in the amount of incident radiation reflected and transmitted as a function of distance along said beamsplitter in a direction parallel to said first and second sides; and
    first and second detectors located on either side of said beamsplitter and extending between said first and second parallel sides, said first detector located between said entrance aperture and said beamsplitter, said detectors located for detecting incident radiation reflected by and transmitted through the same area of said beamsplitter, said area depending upon said angular component, said detectors for providing first and second detector outputs indicative of the intensities of incident radiation reflected and transmitted, said detectors having a width in the direction parallel to said first and second sides that is small in comparison to said portion of said beamsplitter;
    whereby said angular component of incident electromagnetic radiation is determined from the relative intensities of incident radiation reflected and transmitted by said beamsplitter that are detected by said first and second detectors, the effects of scintillation on the determination of said angular component being substantially reduced.

2. A sensor as in claim 1 wherein said first detector has a detecting surface parallel to and facing said beamsplitter and is located at or near said aperture and said second detector has a detecting surface parallel to and facing said beamsplitter and is located on the opposite side of beamsplitter as said first detector directly opposite said first detector, said first and second detectors being equidistant from said beamsplitter.

3. A sensor as in claim 2 wherein:
    said housing has first and second parallel ends joining said first and second parallel sides, said first and second parallel ends and said first and second parallel sides defining said planar aperture as generally rectangular;
    said housing having a bottom side extending between said first and second parallel ends and said first and second parallel sides, said second detector being located between said beamsplitter and said bottom side and coupled thereto;
    said ends and bottom side being substantially non reflective of incident radiation entering said planar aperture.

4. A sensor as in claim 1 wherein the ratio of a difference and a sum of said reflected and transmitted intensities detected by said first and second detectors is indicative of said angular component.

5. A sensor as in claim 1 wherein said beamsplitter includes a transparent optical substrate having a plurality of elongated reflective portions.

6. A sensor as in claim 1 wherein said beamsplitting is optically coupled to said first and second detectors.

7. A sensor as in claim 1 further including first and second optically transparent members for optically coupling said beamsplitter to said first and second detectors.

8. A sensor as in claim 2 further including auxiliary reflecting means for directing incident radiation so that said first and second detectors are irradiated with incident radiation reflected by and transmitted through said beamsplitter for incident radiation that would at least partly be shadowed from irradiating at least one of said detectors by said first detector.

9. A sensor as in claim 8 wherein said auxiliary reflecting means comprises at least one reflecting surface angled with respect to said beamsplitter and located on the side of said beamsplitter opposite said aperture and to the side of said second detector.

10. A sensor as in claim 8 wherein said auxiliary reflecting means comprises at least one reflecting surface angled with respect to said beamsplitter and located adjacent said aperture.

11. A sensor for determining one angular component of electromagnetic radiation incident thereon comprising:

a housing having first and second planar sides having parallel edges defining therebetween two sides of a planar entrance aperture for incident radiation, said sides having facing surfaces reflective of said radiation;

a planar gradient beamsplitter located between said first and second sides and oriented parallel to and spaced apart from said entrance aperture, said beamsplitter having a portion varying in the amount of incident radiation reflected and transmitted as a function of distance along said beamsplitter in a direction parallel to said edges;

a first detector located on the side of said beamsplitter on which said entrance aperture is located and spaced apart from said beamsplitter, said first detector extending between said first and second sides and having a detecting surface that is parallel to and facing said beamsplitter for detecting incident radiation reflected therefrom; and a second detector located on the side of said beamsplitter opposite to that on which said entrance aperture is located and spaced apart from said beamsplitter the same distance as said first detector, said second detector extending between said first and second sides and having a detecting surface that is parallel to and facing said beamsplitter for detecting incident radiation transmitted therethrough;

said first and second detectors having widths in the direction parallel to said entrance aperture that are small in comparison to said portion of said beamsplitter whereby said angular component of incident electromagnetic radiation is determined from the relative intensities of incident radiation reflected and transmitted by said beamsplitter that are detected by said first and second detectors respectively, the effects of scintillation on the determination of said angular component being substantially reduced.

12. A sensor as in claim 11 further comprising first and second ends extending between said first and second sides and between which said beamsplitter is located, said first and second ends having parallel edges that extend between said parallel edges of said first and second sides and define said entrance aperture to be at least generally rectangular, the facing surfaces of said ends being substantially nonreflective of said incident radiation, wherein said first detector is located proximate to said entrance aperture and at least approximately equidistant from said parallel edges of said first and second ends and wherein said first detector has a planar detecting surface which is parallel to said beamsplitter.

13. A sensor as in claim 12 wherein said first and second sides are parallel.

14. A sensor as in claim 11 wherein said beamsplitter includes a transparent optical substrate having a plurality of elongated reflective portions.

15. A sensor as in claim 11 wherein said beamsplitter is optically coupled to said first and second detectors.

16. A sensor as in claim 11 further including first and second optically transparent members for optically coupling said beamsplitter to said first and second detectors.

17. A sensor as in claim 11 further including auxiliary reflecting means for directing incident radiation so that said first and second detectors are irradiated with incident radiation reflected by and transmitted through said beampslitter for incident radiation that would at least partly be shadowed from irradiating at least one of said detectors by said first detector.

18. A sensor as in claim 17 wherein said auxiliary reflecting means comprises at least one reflecting surface angled with respect to said beamsplitter and located on the side of said beamsplitter opposite said aperture and to the side of said second detector.

19. A sensor as in claim 17 wherein said auxiliary reflecting means comprises at least one reflecting surface angled with respect to said beamsplitter and located adjacent said aperture.

20. A sensor as in claim 11 wherein the ratio of a difference and a sum of said reflected and transmitted intensities detected by said first and second detectors is indicative of said angular component.

* * * * *

UNITED STATES PATENT AND TRADEMARK OFFICE
CERTIFICATE OF CORRECTION

PATENT NO. : 4,824,245

DATED : April 25, 1989

INVENTOR(S) : Leland V. Gardner and Arthur H. Hardy

It is certified that error appears in the above-identified patent and that said Letters Patent is hereby corrected as shown below:

On the title page, item [54] and column 1, line 3,
  In the title, replace the word "RESPONSIVE" as the ninth word of the title with the word "INSENSITIVE".

Signed and Sealed this

Twenty-sixth Day of December, 1989

*Attest:*

JEFFREY M. SAMUELS

*Attesting Officer*　　*Acting Commissioner of Patents and Trademarks*